United States Patent [19]
Thompson et al.

[11] Patent Number: 5,553,743
[45] Date of Patent: Sep. 10, 1996

[54] LIQUID DIET DELIVERY SYSTEM AND CONTROL VALVE FOR USE THEREIN

[75] Inventors: William H. Thompson, Mt. Prospect; Roger Arentson, Crystal Lake; Trevor Tomkins, Sycamore, all of Ill.

[73] Assignee: Milk Specialties Company, Dundee, Ill.

[21] Appl. No.: 330,509

[22] Filed: Oct. 27, 1994

[51] Int. Cl.⁶ .................................................. B65D 88/54
[52] U.S. Cl. ........................ 222/52; 222/148; 222/318
[58] Field of Search ............................. 222/52, 148, 318, 222/330, 333

[56] References Cited

U.S. PATENT DOCUMENTS

| | | | |
|---|---|---|---|
| 2,274,308 | 2/1942 | Tschanz | 277/21 |
| 2,444,182 | 6/1948 | Calvin | 277/60 |
| 2,800,365 | 7/1957 | Hodges | 222/318 X |
| 2,821,972 | 2/1958 | Banker | 123/127 |
| 3,017,057 | 1/1962 | Reed | 222/52 X |
| 3,216,619 | 11/1965 | Richards et al. | 222/318 X |
| 3,228,524 | 1/1966 | Richards | 210/138 |
| 3,255,920 | 7/1966 | Cornelius | 222/318 X |
| 3,722,525 | 3/1973 | Epple | 137/106 |
| 3,731,845 | 5/1973 | Booth | 222/318 X |
| 3,908,687 | 9/1975 | Wood | 137/106 |
| 4,140,245 | 2/1979 | Castillo | 222/318 X |
| 4,253,481 | 3/1981 | Sarlls, Jr. | 137/112 |
| 4,286,573 | 9/1981 | Nickel | 126/362 |
| 4,407,431 | 10/1983 | Hutter, III | 222/318 X |
| 4,448,211 | 5/1984 | Yoshida | 137/112 |
| 4,465,210 | 8/1984 | Iwanami | 222/318 X |
| 4,570,856 | 2/1986 | Groth et al. | 239/310 |
| 4,832,075 | 5/1989 | Dubach | 137/512 |
| 5,121,857 | 6/1992 | Hutchinson | 222/318 |
| 5,240,040 | 8/1993 | Barnum et al. | 137/607 |

FOREIGN PATENT DOCUMENTS

| | | | |
|---|---|---|---|
| 1221913 | 7/1966 | Germany | 222/318 |
| 2232400 | 12/1990 | United Kingdom | 222/318 |

*Primary Examiner*—Andres Kashnikow
*Assistant Examiner*—Kenneth Bomberg
*Attorney, Agent, or Firm*—Bell, Seltzer, Park & Gibson, P.A.

[57] ABSTRACT

The invention provides a system for dispensing a fluid from a source to at least one delivery station. The system selectively establishes a fluid flow in a first flow direction or a second flow direction and comprises a first supply line having a first first end and a second first end, the first first end being coupled with the source of the fluid. The system further comprises a second supply line having a second first end and a second second end, the at least one delivery station being coupled to the second supply line between the second first end and the second second end. The system further comprises a return line having a third first end and a third second end, the third first end being coupled to the source of the fluid. The system still further comprises a reversing valve for selectively establishing fluid flow in the first flow direction or the second flow direction. The reversing valve couples either the first second end or the third second end to the second first end and the other of the first second end and the third second end to the second second end. The system still further comprises a control valve responsive to the fluid flow for selectively establishing fluid communication between the second supply line and one of the delivery stations.

17 Claims, 5 Drawing Sheets

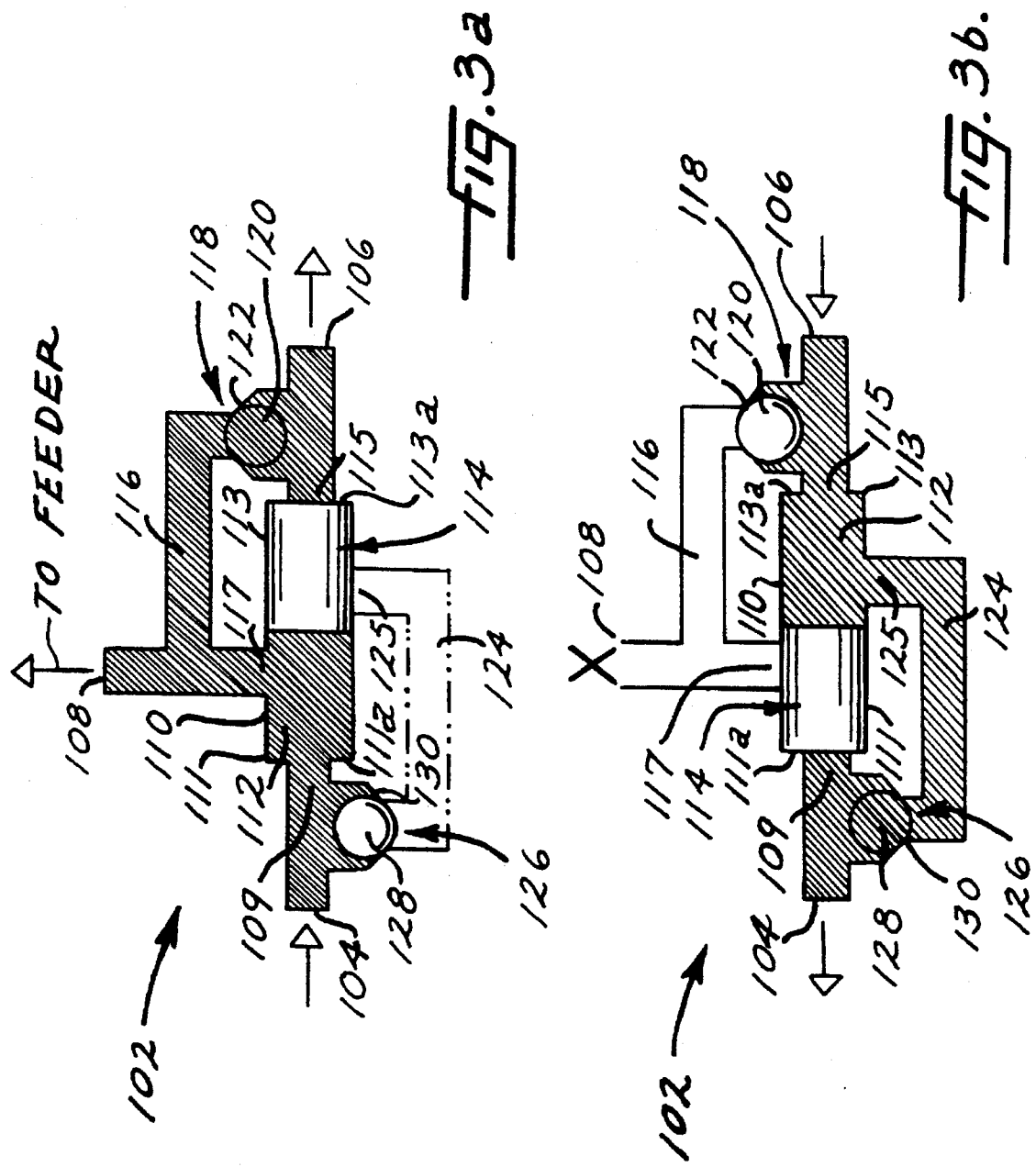

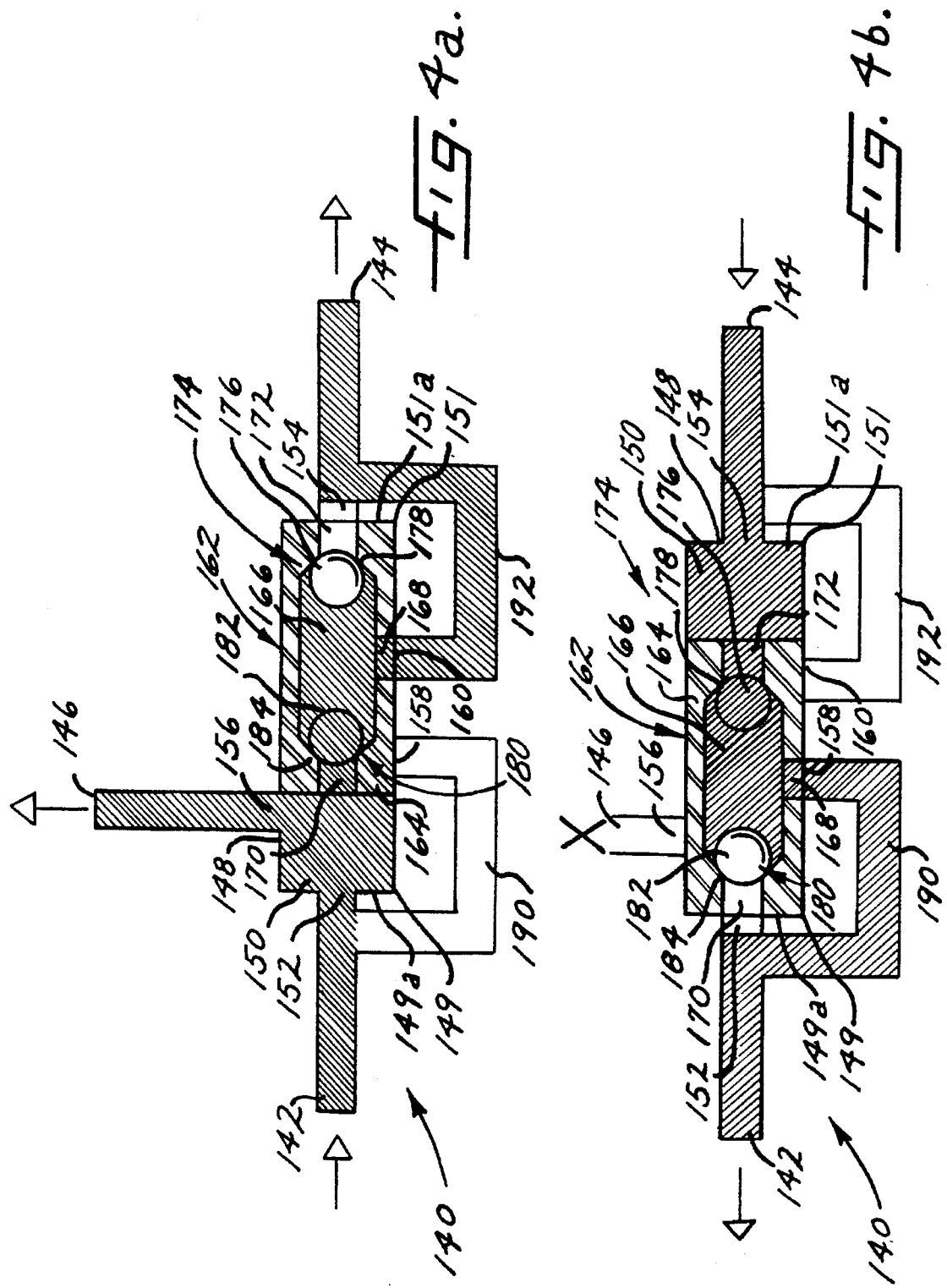

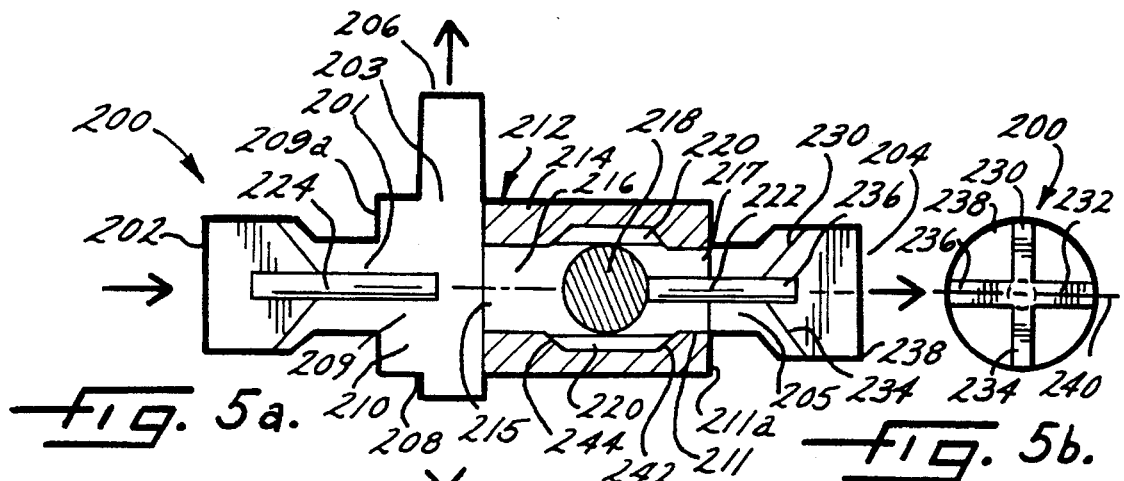
Fig. 5a.
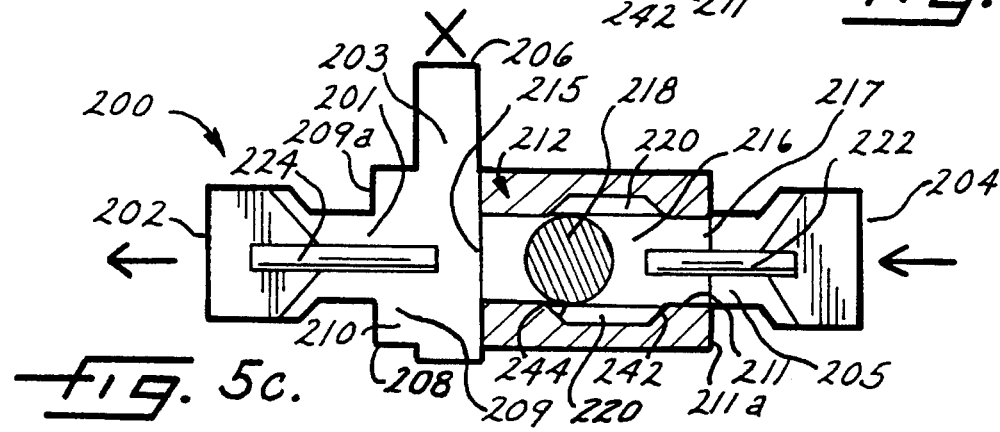
Fig. 5b.
Fig. 5c.
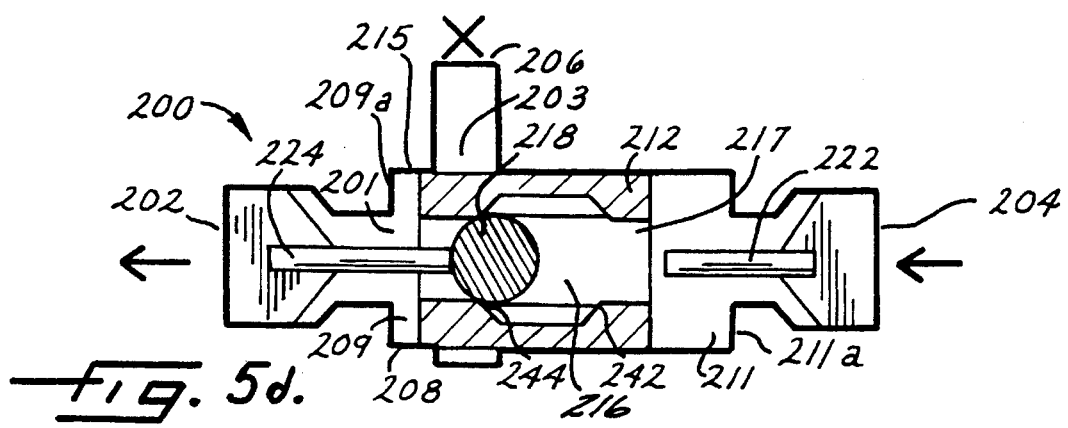
Fig. 5d.
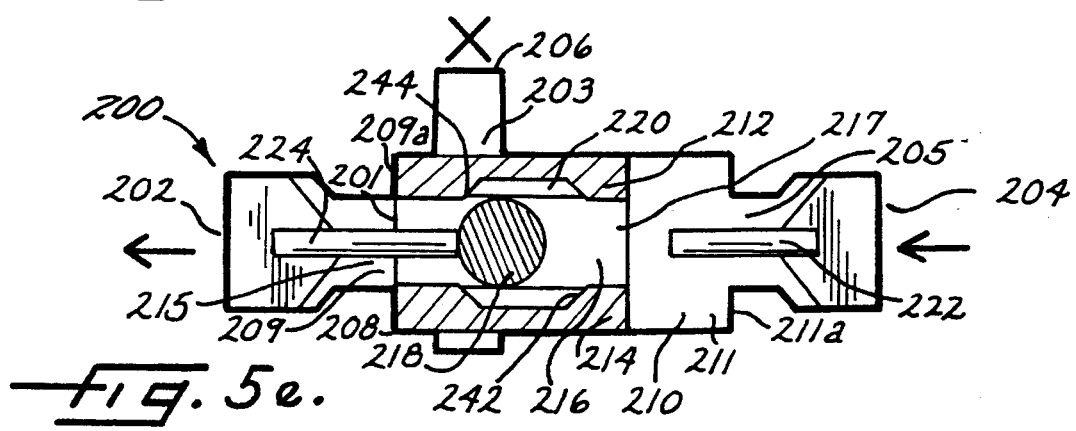
Fig. 5e.

LIQUID DIET DELIVERY SYSTEM AND CONTROL VALVE FOR USE THEREIN

BACKGROUND OF THE INVENTION

The present invention relates to a system for dispensing fluid, such as a liquid diet, from a source of the fluid to at least one delivery station. The present invention also relates to a control valve for use in such a system.

In animal operations, it has been observed that, a liquid diet when offered as a supplement to nursing pigs, has been shown to increase their growth rate. Also, after weaning, animals such as piglets and calves tend to drink substantial amounts of water but eat little solid food. Until the animal more willingly eats solid food, the growth of the animal is slowed due to this increased consumption of water and attendant nutritional deficiency.

To solve this problem and improve growth rate, feeding systems have been developed to deliver liquid diet to one or more delivery stations located, for example, in a farrowing crate. The liquid diet is mixed in a mixer and delivered through a supply line to the delivery stations.

Each delivery station includes a feeder such as a nipple or bowl for providing the diet directly to one or more animals. One or more delivery stations are located in a farrowing crate or pen containing the animals. The liquid diet circulates in the system in response to gravity or a pump. A return line allows the unused fluid to recirculate back to the mixer.

One problem with such liquid diet delivery systems is the buildup of bacteria and other contaminants in the system. Animals such as piglets and calves are particularly susceptible to disease as a result of ingesting these bacteria and contaminants.

Therefore, periodically, as a routine operation of the system, the system must be cleaned. To clean the system, a cleaning solution is conveyed through the system. The mixer is filled with the cleaning fluid and the fluid is pumped through the system, recirculating back to the mixer.

However, during the cleaning operation, unless the delivery stations are isolated from the cleaning solution, animals with access to the delivery stations may be harmed by the cleaning solution. Therefore, flow of liquid in the system between the supply line and the delivery stations must be interrupted whenever cleaning fluid is present in the system.

Liquid diet distribution systems have included manually operated valves located at each delivery station. Before the system cleaning operation, each valve is manually closed to interrupt flow of the fluid in the system to the delivery station. With the valve closed, the delivery station is isolated from the supply line. Cleaning fluid is then circulated in the system without risk to the animals. Following the cleaning operation, each valve is opened and the system may again be used for providing diet, water or other fluid to the animals.

One limitation of such a system is the need for human intervention for operation of the valves. Each valve must be manually turned off before cleaning fluid is circulated in the system. Similarly, each valve must be manually turned on again before the liquid diet may be provided to the individual delivery stations. This manual intervention is burdensome and time consuming, particularly in systems having a large number of delivery stations or delivery stations which are spaced substantial distances apart. Moreover, the requirement of manual intervention in the operation of the system creates the opportunity for error in system operation.

One or more valves may not be turned off before circulation of cleaning fluid, allowing the cleaning fluid to be pumped to a delivery station, resulting in possible death of animals. Also, one or more valves may not be turned on after a cleaning operation so that no liquid diet is provided to one or more delivery stations, again resulting in possible death of animals.

Liquid diet delivery systems have included a source such as a bin or tank for storing the diet before delivery. To simplify transportation and storage, diet is preferably concentrated in a liquid or powder form. Therefore, a mixer must be provided for mixing the concentrated diet with a liquid such as water for delivery by the delivery system. However, manual mixing of concentrated diet and water is time consuming and labor intensive. Also, measuring the requisite amounts of concentrated diet and water is susceptible to error.

Accordingly, there is a need for a system for dispensing fluids such as liquid diet to one or more delivery stations. There is a further need for such a system capable of circulating other fluids, such as cleaning fluid, without providing the other fluids to the one or more delivery stations. There is a still further need for such a system including a mixer which automatically combines predetermined amounts of concentrated diet and a liquid such as water.

Still further, there is a need for such a system which will automatically actuate predetermined valves appropriately to ensure that such other fluids as are harmful to animals are not delivered to a delivery station.

SUMMARY OF THE INVENTION

The invention provides a system for dispensing a fluid from a source of the fluid to at least one delivery station, which may be a nipple or bowl for delivering the diet to one or more animals. The system selectively establishes a fluid flow in a first flow direction or a second flow direction. The system comprises a first supply line having a first first end and a second first end, the first end being coupled with the source, a second supply line having a second first end and a second second end, the at least one delivery station being coupled to the second supply line between the second first end and the second second end, and a return line having a third first end coupled to the source and a third second end. The system further comprises a reversing valve means for selectively establishing the fluid flow in the first flow direction or the second flow direction, the reversing valve means coupling one of the first second end or the third second end to the second first end and the other of the first second end and the third second end to the second second end. The system further comprises a control valve means responsive to the fluid flow for selectively establishing fluid communication between the second supply line and one delivery station.

The present invention further provides a system for dispensing a fluid from a source of the fluid to at least one delivery station. The system comprises a fluid conductor circuit or means for communicating the fluid, the fluid conductor means having a first end and a second end, at least one end being in fluid communication with the source. The system further comprises a reversing valve means for selectively establishing a fluid flow in the fluid conductor means in either a first flow direction or a second flow direction, and control valve means responsive to the fluid flow for selectively establishing fluid communication between one delivery station and the fluid conductor means.

The invention still further provides a valve for use in a system for controlling a fluid supply from the system to a system output. Fluid is supplied by the control valve from the system to the system output. The system selectively establishes a fluid flow in a first flow direction or a second flow direction, the fluid supply being established when the fluid flow is in the first flow direction and being interrupted when the fluid supply is in the second flow direction. The valve comprises a body defining a chamber, the body having a first system port, a second system port and an outlet port, each port being in fluid communication with the chamber, the first system port and the second system port being in fluid communication with the system, the outlet port being in fluid communication with the system output. Fluid is received by the control valve at either the first system port or the second system port and provided to the outlet's outlet port. The valve further comprises control means for controlling fluid communication among the first system port, the second system port and the outlet port. The control means is moveable between a first position and a second position. The control means establishes fluid communication among the first system port, the second system port and the outlet port when the control means is in the first position. The control means interrupts fluid communication between the second system port and the outlet port when the control means is in the second position and the first system port are in fluid communication when the control means is in the second position. The control means moves to the first position in response to fluid flow in the first flow direction, and the control means moves to the second position responsive to the fluid flow in the second flow direction. The control means moves from the first position to the second position at a first time after the system reverses the fluid flow from the first flow direction to the second flow direction. The control means further includes a check valve means for interrupting fluid communication between the second system port and the outlet port at a second time after the system reverses the fluid flow from the first flow direction to the second flow direction, the second time occurring before the first time.

The present invention provides a system for dispensing liquid diet to a plurality of delivery stations. The system includes a source of the diet such as a receptacle which mixes the liquid diet. The system also includes a supply line coupled between the receptacle and a plurality of delivery stations, and a return line between the delivery stations and the receptacle. The supply line preferably couples the receptacle and a first delivery station, with the delivery stations being coupled together in series and the return line coupling the last series-coupled delivery station with the receptacle. However, a plurality of supply lines could couple a like plurality of delivery stations to the receptacle in a parallel arrangement, with a like plurality of return lines coupling the delivery stations to the receptacle. The system further preferably includes a pump or other means for circulating the diet in the system and a reversing valve means such as a valve system for reversing the flow of the fluid in the system. The system still further includes one or more control valves responsive to the direction of flow in the system. The one or more control valves couple the supply line and the return line. Each of the one or more control valves couples the system and a respective delivery station.

In a first mode of operation, the receptacle is filled with diet. If the diet is in powdered form, the diet is mixed with liquid to produce the liquid diet. The pump and the reversing valve means are activated to circulate the liquid diet in the system in a first flow direction. Fluid is conveyed from the receptacle to the supply line.

If the system is configured as a series system, a first control valve has a first system port coupled to the supply line and a second system port coupled to a first system port of a second control valve. The second control valve has its first system port coupled to the second system port of the first control valve and a second system port coupled to a first system port of a third control valve. The final control valve in the series has a first system port coupled to the second system port of the previous control valve in the series and a second system port coupled to the return line. Each control valve has an outlet port coupled to a delivery station.

If the system is configured as a parallel system, the supply line is coupled to the first system port of each control valve and the return line is coupled to the second system port of each control valve. Each of the one or more control valves responds to the flow of the diet in the first flow direction. Each of the control valves receives diet at a first system port and provides a first portion of the received diet to the outlet port coupled to the delivery station and a second portion of the received diet to a second system port. In this manner, the diet is conveyed to the control valves and to the respective delivery stations.

In a second mode of operation, the receptacle is filled with cleaning fluid. The pump and reversing valve means are activated to circulate fluid in the system in a second flow direction, opposite the first flow direction. Cleaning fluid is conveyed from the receptacle to the return line. Each of the one or more control valves responds to the flow of the cleaning fluid in the second flow direction by moving to a second configuration. Each of the control valves, when in the second configuration, receives cleaning fluid at the second system port and provides the received fluid to the first system port, and blocks flow of the fluid to the outlet port.

The preferred embodiment of the control valve of the present invention includes a shuttle within a chamber formed by a body. The shuttle is movable between a first position and a second position within the chamber, responsive to hydraulic pressure associated with flow of the fluid in a first direction or a second direction. The valve has a first system port, a second system port and an outlet port in fluid communication with the chamber.

The shuttle preferably includes a shuttle body forming a bore. Within the bore, a ball is free to move between a first position and a second position to function as a check valve. When the shuttle is at either of the first shuttle position or the second shuttle position, a stop dislodges the ball to allow fluid to flow. When the shuttle is in the first shuttle position, fluid flows from the first system port to the second system port. When the shuttle is in the second shuttle position, fluid flows from the second system port to the first system port. When the shuttle is in the first shuttle position, fluid can flow from the first system port to the outlet port. When the shuttle is in the second shuttle position and fluid flows from the second system port to the first system port, no fluid can flow from either the first system port or the second system port to the outlet port.

It is therefore an advantage of the present invention to provide a system for dispensing a fluid to at least one delivery station in response to fluid flow through the system in a first direction.

It is a further advantage of the present invention to provide a system for dispensing a liquid diet to at least one delivery station, the system reversing flow of the fluid in the system to circulate cleaning fluid for cleaning the system, and the flow of cleaning fluid to the delivery stations being automatically blocked in response to such reversing of flow of the fluid in the system.

It is a still further advantage of the present invention to provide a control valve for automatically controlling flow of fluid in response to direction of fluid flow in such a system.

Further advantages and features of the present invention will be apparent from the following specification and claims when considered in connection with the accompanying drawings illustrating the preferred embodiment of the invention.

BRIEF DESCRIPTION OF THE DRAWINGS

FIG. 3 is a series of cutaway views illustrating operation of a first embodiment of a flow direction sensing valve for use with the system of FIGS. 1 or 2.

FIG. 4 is a series of cutaway views illustrating operation of a second embodiment of a flow direction sensing valve for use with the system of FIGS. 1 or 2.

FIG. 5 is a series of cutaway views illustrating operation of a third, preferred, embodiment of a flow direction sensing valve for use with the system of FIGS. 1 or 2.

In order to facilitate understanding of the drawings, like reference numerals will indicate like elements throughout the drawings.

DETAILED DESCRIPTION OF THE PREFERRED EMBODIMENT

Figure 1:
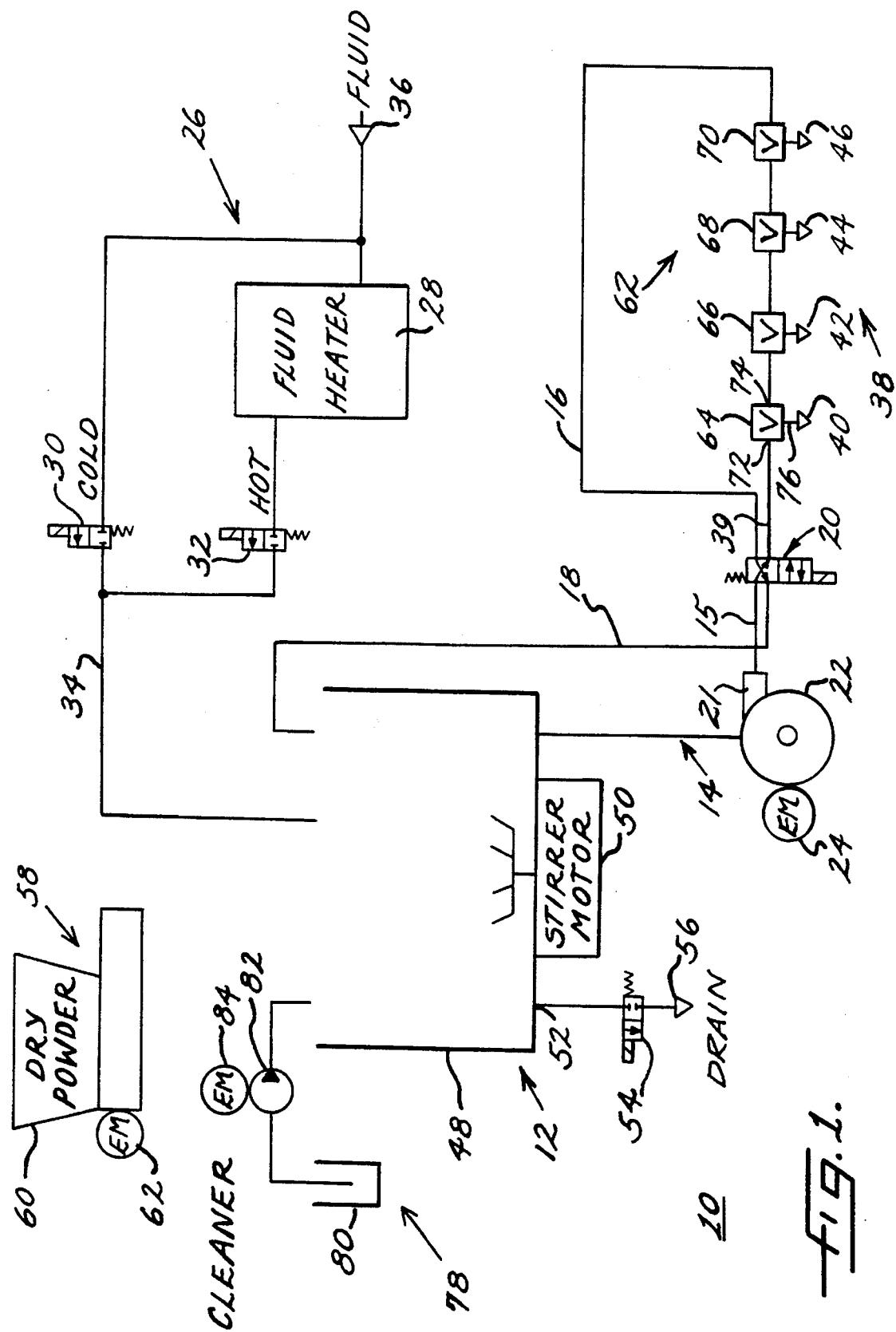
FIG. 1 is a schematic block diagram illustrating a first embodiment of a system according to the present invention.

FIG. 1 is a schematic block diagram illustrating a first embodiment of a system 10 according to the present invention. The system 10 includes a mixer 12, a first supply line 14, a second supply line 16, a return line 18, a reversing valve system 20 and a pump 22. A line 15 couples the outlet 21 of the pump 22 to the reversing valve system 20. The first supply line 14, the second supply line 16 and the return line 18 thus form a fluid conductor circuit for communicating fluid in the system 10. The system 10 may also include a pump 22, driven by a pump motor 24, for circulating fluid in the system 10. In FIG. 1, the pump 22 is included in the first supply line 14. The pump 22 circulates fluid in the system 10, from the mixer 12 to the first supply line 14, to the second supply line 16, to the return line 18, and back to the mixer 12. The pump 22 thus circulates fluid and establishes fluid flow in the system 10.

The system 10 may further include a fluid supply system 26 for providing fluid such as water to the mixer 12. The fluid supply system 26 includes a fluid heater 28, a cold fluid valve 30, a hot fluid valve 32, and a fluid supply line 34. The fluid heater 28 receives fluid from a source 36 of fluid, for example a commercial water supply. Responsive to operation of the cold fluid valve 30 and the hot fluid valve 32, the fluid supply system 26 provides fluid to the mixer 12.

The system 10 may be advantageously used to provide fluids such as water and liquid diet to a plurality 38 of delivery stations, including a first delivery station 40, a second delivery station 42, a third delivery station 44 and a fourth delivery station 46. A line 39 couples the reversing valve system 20 and the first delivery station 40, and the second supply line 16 couples the fourth delivery station 46 and the reversing valve system 20. The plurality 38 of delivery stations may be installed, for example, in a plurality of farrowing crates or animal pens (not shown), one delivery station per pen. Alternatively, the plurality 38 of delivery stations could be installed in one or more farrowing crates or pens holding a plurality of animals.

For preparing the liquid diet for dispensing to the plurality 38 of delivery stations, the mixer 12 preferably includes a mixer container 48, a stirrer motor 50, a drain 52 and a drain valve 54. The drain valve 54 allows the contents of the mixer container 48 to be drained to an outlet 56.

Figure 2:
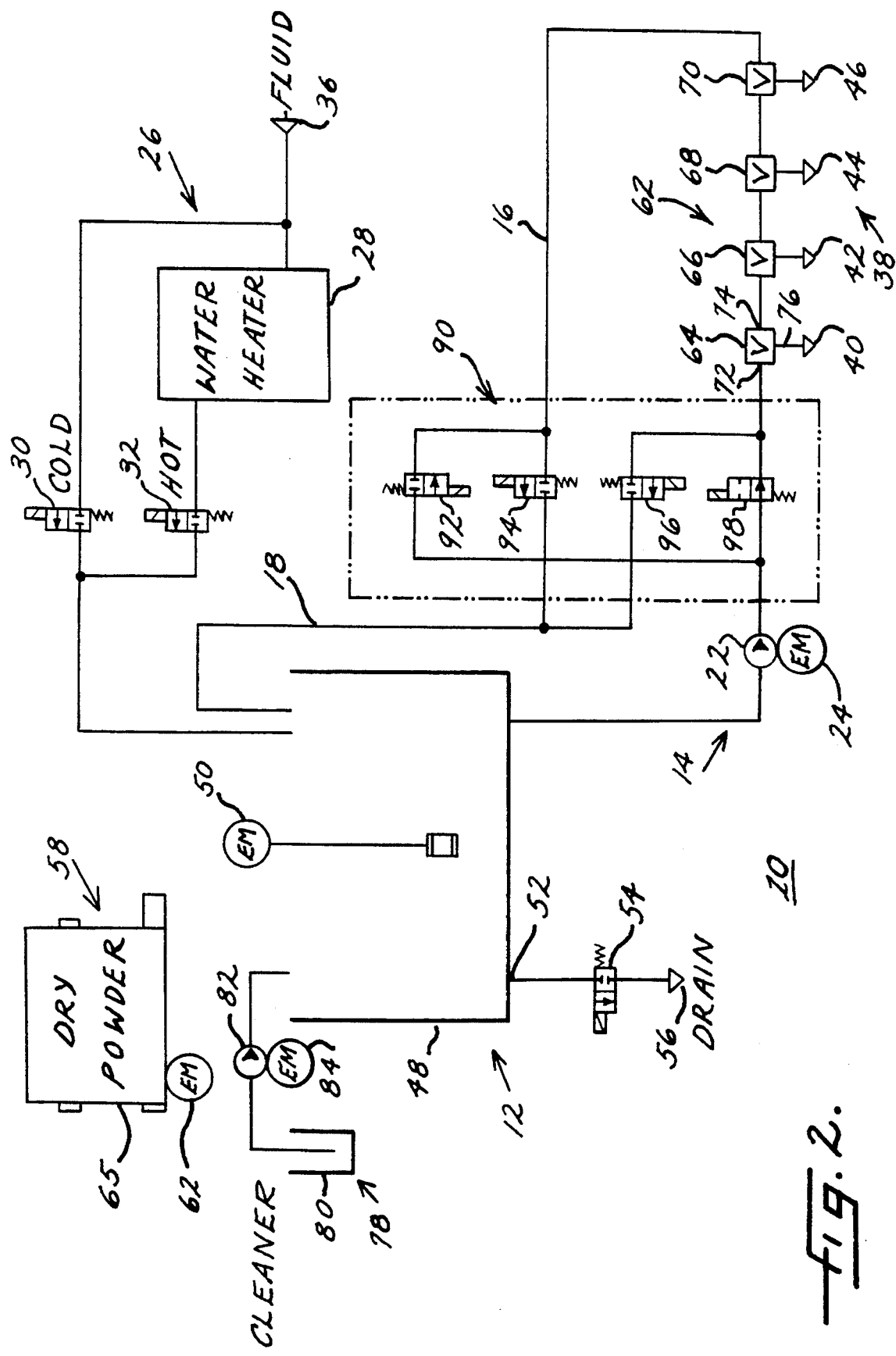
FIG. 2 is a schematic block diagram illustrating a second embodiment of a system according to the present invention.

The system 10 may further include a powdered dry diet bin 58. The mixer container 48 receives a measured supply of powdered dry diet from the powdered dry diet bin 58. The powdered dry diet bin 58 includes a hopper 60 for storing the diet in either liquid or powdered form and a motor 62 for conveying a measured amount of the diet to the mixer container 48. Alternatively, the motor 62 may be omitted and the diet may be conveyed to the mixer container 48 by gravity or other means. The mixer container 48 may also receive a supply of water from the water supply line 34 of the water supply system 26. The diet may instead be mixed with some liquid other than water. The stirrer motor 50 is actuated to stir together the diet and the water. The stirrer motor 50 may be located below the mixer container 48 to drive an agitator in the bottom of the mixer container 48, as illustrated in FIG. 1, or the stirrer motor 48 may be located at another position to drive an agitator which enters the top of the mixer container 48. Such a configuration is illustrated in FIG. 2.

After the diet is properly mixed, the pump motor 24 (FIG. 1) is actuated and the pump 22 pumps the liquid diet in the system 10. The liquid diet flows in the first supply line 14, through the reversing valve system 20 to the second supply line 39.

The second supply line 16 includes a plurality 63 of control valves, including a first control valve 64, a second control valve 66, a third control valve 68 and a fourth control valve 70. Each of the plurality 62 of control valves controls the supply of fluid, such as liquid diet, from the second supply line 16 to a respective one of the plurality 38 of delivery stations. A single control valve may control the supply of fluid to more than a single delivery station, so that there need not be a one-to-one correspondence between delivery stations and control valves. The plurality 63 of control valves thus selectively establishes fluid communication between the second supply line 16 and the plurality 38 of delivery stations.

The first control valve 64 includes a first system port 72, a second system port 74 and an outlet port 76. The first system port 72 receives fluid such as the liquid diet from the reversing valve system 20. The first control valve 64 communicates received fluid to the outlet port 76 and to the second system port 74. Structure and operation of a control valve such as the first control valve 64 are described below in conjunction with FIGS. 3–5. Preferably, the structure and operation of the first control valve 64, the second control valve 66, the third control valve 68, and the fourth control valve 70 are substantially identical. Fluid such as liquid diet in the second supply line 16 not provided by the plurality 62 of control valves to the plurality 38 of delivery stations is supplied by the reversing valve system 20 to the return line 18, and returned to the mixer container 48.

The reversing valve system 20 establishes fluid flow in the system in either a first flow direction or a second flow direction. As illustrated in FIG. 1, in a first configuration, the reversing valve system 20 establishes fluid flow from the pump 22 to the plurality 63 of control valves, in a counterclockwise direction in the second supply line. In a second position, the reversing valve system 20 establishes fluid flow in a clockwise direction in the second supply line 16. The reversing valve system 20 thus selectively establishes a fluid flow in the system 10 in either the first flow direction or the second flow direction. The reversing valve system 20 is preferably a four-way directional control valve.

From time to time, as a routine operation of the system 10, the system 10 must be cleaned. Cleaning allows removal of fluids such as liquid diet which have solidified and deposited within the system 10. Moreover, cleaning allows the system 10 to be cleaned by removing or destroying bacteria which may be harmful to animals which use the plurality 38 of delivery stations.

For cleaning the system 10, the system 10 preferably includes a cleaning solution supply system 78. The cleaning solution supply system 78 includes a cleaning solution receptacle 80 and a cleaning solution pump 82, driven by a motor 84. To initiate a cleaning operation of the system 10, the pump 82 pumps cleaning solution from the receptacle 80 to the mixer container 48. The cleaning solution may be a concentrate, to be diluted with water provided by the water supply system 26. As will be recognized by those ordinarily skilled in the art, the mixer 12 could comprise a plurality of mixer containers such as mixer container 48, each mixer container being used for mixing different liquids including liquid diet and cleaning solution for subsequent circulation in the system 10. Alternatively, the pump 82 and motor 84 may be omitted and cleaning solution conveyed to the mixer container 48 by gravity or other means.

To provide the cleaning solution to the plurality 63 of control valves, the reversing valve system 20 switches to a second position. In the second position, as illustrated in FIG. 1, the cleaning fluid flows in a clockwise direction in the second supply line 16. When the fluid flow is in this second flow direction, the plurality 62 of control valves do not provide fluid, such as cleaning solution, to the plurality 38 of delivery stations. Thus, the first control valve 64 receives cleaning fluid from the second control valve 66 at the second system port 74. The first control valve 64 provides substantially all the received cleaning fluid to the first system port 72 and substantially none of the received cleaning fluid to the outlet port 76.

Thus, the system 10 automatically provides liquid diet to the plurality 38 of delivery stations and also automatically prevents the supply of cleaning solution to the plurality 38 of delivery stations. The plurality 63 of control valves respond to the flow direction established by the reversing valve system 20 for automatically controlling supply of fluid to the plurality 38 of delivery stations.

As will be understood by those ordinarily skilled in the art, components of the system 10, such as the reversing valve system 20, the motors 24, 50, 62 and 84, and valves such as cold water valve 30, hot water valve 32 and drain valve 54, may be automatically controlled by a computer or other electronic or mechanical device. Automatic control reduces the need for human intervention and the opportunity for human error, as well as increasing overall reliability of the system 10. Similarly, the plurality 63 of control valves which respond automatically to the direction of fluid flow eliminate the possibility of operator error and the attendant risk of injury to animals.

FIG. 2 is a schematic block diagram illustrating a second embodiment of a system 10 according to the present invention. In FIG. 2, the arrangement of the mixer 12, first supply line 14, second supply line 16, return line 18, pump 22 and pump motor 24, water supply system 26, plurality 38 of delivery stations and plurality 63 of control valves, and powdered diet bin 58 is substantially the same as in the arrangement illustrated in FIG. 1, so no detailed discussion of these components will be repeated here. In FIG. 2, however, the function of reversing the flow direction of fluid in the system 10 is provided by a plurality 90 of two-way valves. The plurality 90 of two-way valves includes a first valve 92, a second valve 94, a third valve 96 and a fourth valve 98. Alternatively, as will be understood by those ordinarily skilled in the art, the reversing function could be provided by a group of two three-way valves (not shown). Use of two-way valves or three-way valves may be preferable where the four-way directional control valve illustrated in FIG. 1 is not available or where the two-way valves or three-way valves provide a more cost-effective design, i.e., a design which uses fewer parts or is less expensive to manufacture or implement. Still further, flow reversal could be accomplished using a bi-directional pump in the place of the pump 22. A bi-directional pump is capable of reversing the flow through the pump so that the port normally used as the pressure or outlet port of the pump becomes the suction or inlet port. The reverse is true for the other pump port.

FIG. 3 is a series of cutaway views illustrating operation of a first embodiment of a flow direction sensing valve 102 for use with the system 10 of FIGS. 1 or 2. In FIGS. 3a and 3b, the presence of fluid in portions of the valve 102 is indicated by cross-hatching. The valve 102 has a first system port 104, a second system port 106, and an outlet port 108. The valve 102 may be used in conjunction with the system 10 of FIGS. 1 and 2 to provide the function of the first control valve 64 in FIGS. 1 and 2; with first system port 104 corresponding to first system port 72, second system port 106 corresponding to second system port 74, and outlet port 108 corresponding to outlet port 76.

The valve 102 has a body 110 defining a chamber 112. The body has a first aperture 109, a second aperture 115, a third aperture 117, and a fourth aperture 125. The chamber 112 is in fluid communication with the first system port 104 through the first aperture 109. The chamber 112 is in fluid communication with the second system port 106 through the second aperture 115. The chamber 112 is in fluid communication with the outlet port 108 through the aperture 117. The chamber 112 has a first end 111 terminating in a first wall 111a and a second end 113 terminating in a second wall 113a. Within the chamber 112 is a shuttle 114. The shuttle 114 is movable between a first position, adjacent the first wall 111a, illustrated in FIG. 3a, and a second position, adjacent the second wall 113a, illustrated in FIG. 3b.

The valve 102 further includes a first bypass 116 which is coupled to the chamber 112 at the third aperture 117. The first bypass 116 is also coupled to the outlet port 108 and to the second system port 106. The first bypass 116 includes a first check valve 118 for preventing the flow of fluid from the second system port 106 through the first bypass 116 to the outlet port 108.

The check valve 118 includes a valve ball 120 and a valve seat 122. In response to fluid pressure from the second system port 106, the valve ball 120 is urged against the valve seat 122 to preclude fluid flow from the second system port 106 to the first bypass 116. In response to fluid pressure from the first bypass 116, the valve ball 120 is urged away from the valve seat 122 to permit fluid flow from the first bypass 116 to the second system port 106.

The valve 102 further includes a second bypass 124 which is coupled to the chamber 112 at the fourth aperture 125. The second bypass 124 is also coupled with the first system port 104. The second bypass 124 includes a second check valve 126 for preventing flow of fluid from the first system port 104 through the second bypass 124 to the chamber 112. The check valve 126 includes a valve ball 128 and a valve seat 130. In response to fluid pressure from the first system port 104, the valve ball 128 is urged against the valve seat 130 to preclude fluid flow from the first system port 104 to the second bypass 124. In response to fluid pressure from the second bypass 124, the valve ball 128 is urged away from the valve seat 130 to permit fluid flow from the second bypass 124 to the first system port 104.

FIG. 3a illustrates the valve 102 configured in response to flow of fluid in the first direction, counterclockwise, in the second supply line 16 (FIG. 1), from left to right in FIG. 3. Responsive to fluid flow in the first direction, the valve ball 128 of the second check valve 126 is urged against the valve seat 130 to interrupt fluid communication from the first system port 104 to the second bypass 124. Also responsive to fluid flow in the first direction, the shuttle 114 is urged to the right to the second end 113 of the chamber 112 toward the second wall 113a. As the shuttle moves to the right, it opens the third aperture 117 to the first bypass 116 and the outlet port 108 and blocks the fourth aperture 125 to the second bypass 124. Fluid pressure in the first bypass 116 urges the valve ball 120 of the first check valve 118 away from the valve seat 122 permitting fluid flow from the first bypass 116 to the second system port 106. With the shuttle in the first position at the second end 113 of the chamber 112, engaging the second wall 113a as shown in FIG. 3a, fluid such as liquid diet moves from the first system port 104 to the outlet port 108 and through the first bypass 116 and first check valve 118 to the second system port 106.

FIG. 3b illustrates the configuration of the valve 102 when the direction of flow of fluid in the second supply line 16 is in the second, clockwise direction (FIG. 1), from right to left in FIG. 3. When flow in the second supply line 16 is reversed from the first flow direction to the second flow direction, the valve ball 120 of the first check valve 118 is urged by fluid pressure from the second system port 106 against the valve seat 122. The first check valve 118 thus prevents the flow of fluid to the first bypass 116 and the outlet port 108. In response to fluid pressure from the second system port 106, the shuttle 114 is urged to the left in FIG. 3, toward the first end 111 and the first wall 111a of the chamber 112.

As the shuttle 114 moves from the second end 113 toward the first end 111 of the chamber 112, the shuttle 114 no longer blocks the fourth aperture 125, permitting fluid to flow from the second system port 106 through the chamber 112 to the second bypass 124. Fluid pressure in the second bypass 124 urges the valve ball 128 of the second check valve 126 away from the valve seat 130, allowing fluid to flow from the second bypass 124 to the first system port 104.

Also as the shuttle 114 moves toward the first end 111 of the chamber 112, the shuttle 114 blocks the third aperture 117 from the chamber 112 to the outlet port 108. Thus, no fluid flows from either the chamber 112 or the first system port 104 to the outlet port 108 and fluid flow to the outlet port 108 is interrupted. The shuttle 114 moves to the left until it engages the first wall 111a.

Preferably, after the fluid flow is reversed from the first direction (FIG. 3a) to the second direction (FIG. 3b), the check valve 118 closes immediately to prevent flow of fluid from the second system port 106 to the outlet port 108. For applications in which the valve 102 is used in conjunction with the system 10 of FIG. 1, the fluid circulated in the system 10 in the second direction may be cleaning solution or other fluid harmful to animals. The first check valve 118 interrupts flow of this fluid to the outlet port 108 while the shuttle 114 moves from the second end 113 to the first end 111 of the chamber 112.

Preferably, the first check valve 118 closes before the shuttle 114 moves from the second end 113 to the first end 111 of the chamber 112. After the first check valve 118 closes, full system fluid pressure is applied to the shuttle 114 to positively move the shuttle 114 to the first end 111 of the chamber 112.

After the shuttle 114 has moved from the second position (FIG. 3a) to the first position (FIG. 3b), fluid is prevented from flowing to the outlet port 108 by the shuttle 114. When the shuttle 114 has moved to the second position adjacent the first wall 111a (FIG. 3b), the second bypass 124 is opened and fluid is allowed to flow from the chamber 112 through the second bypass 124 and the second check valve 126 to the first system port 104. Thus, the shuttle 114, the first check valve 118 and the second check valve 126 control fluid communication among the first system port 104, the second system port 106 and the outlet port 108.

FIG. 4 is a series of cutaway views illustrating operation of a second embodiment of a flow direction sensing valve 140 for use with the system 10 of FIGS. 1 or 2. The valve 140 includes a first system port 142, a second system port 144 and an outlet port 146. The valve 140 may be used in conjunction with the system 10 of FIG. 1 or 2 to provide the function of the first control valve 64 in FIGS. 1 and 2, with first system port 142 corresponding to first system port 72, second system port 144 corresponding to second system port 74, and outlet port 146 corresponding to outlet port 76.

In FIG. 4, the valve 140 has a body 148 defining a chamber 150. The chamber 150 has a first end 149 terminating in a first wall 149a and a second end 151 terminating in a second wall 151a. The chamber 150 has a first aperture 152, a second aperture 154, a third aperture 156, a fourth aperture 158 and a fifth aperture 160. The chamber 150 is in fluid communication with the first system port 142 through the first aperture 152. The chamber 150 is in fluid communication with the second system port 144 through the second aperture 154. The chamber 150 is in fluid communication with the outlet port 146 through the third aperture 156.

A shuttle 162 is located in the chamber 150. The shuttle 162 is movable within the chamber 150 between a first position adjacent the second wall 151a, illustrated in FIG. 4a, at the second end 151 of the chamber 150 and a second position adjacent the first wall 149a, illustrated in FIG. 4b, at the first end 149 of the chamber 150. The shuttle 162 has a shuttle body 164 defining a bore 166. The shuttle body 164 has a shuttle outlet port 168 in fluid communication with the bore 166. The shuttle body 164 further includes a first shuttle port 170 in fluid communication with the bore 166 and a second shuttle port 172 in fluid communication with the bore 166.

A first check valve 174 is located within the bore 166 at the second shuttle port 172. The first check valve 174 includes a valve ball 176 and a valve seat 178. In response to fluid pressure from the bore 166, the valve ball 176 is urged against the valve seat 178 to interrupt fluid flow from the bore 166 to the second shuttle port 172. In response to fluid pressure from the second shuttle port 172, the valve ball 176 is urged away from the valve seat 178 to permit fluid flow from the second shuttle port 172 to the bore 166.

A second check valve 180 is located within the bore 166 at the first shuttle port 170. The second check valve 180 includes a valve ball 182 and a valve seat 184. In response to fluid pressure from the bore 166, the valve ball 182 is urged against the valve seat to interrupt fluid flow from the bore 166 to the first shuttle port 170. In response to fluid pressure from the first shuttle port 170, the valve ball 182 is urged away from the valve seat 184 to permit fluid flow from the first shuttle port 170 to the bore 166.

The valve 140 further includes a first bypass 190 in fluid communication with the first system port 142 and in fluid communication with the chamber 150 through the fourth aperture 158. The valve 140 still further includes a second bypass 192 in fluid communication with the second system port 144 and in fluid communication with the chamber 150 through the fifth aperture 160. The presence of fluid in portions of the valve 140 is indicated in FIGS. 4a and 4b by cross-hatching.

FIG. 4a illustrates the configuration of the valve 140 in response to the flow of fluid in the first, counterclockwise, direction in the second supply line 16 (FIG. 1), from left to right in FIG. 4. In response to the flow of fluid, the shuttle 162 is urged toward the second end 151 of the chamber 150, to the right in FIG. 4. With the shuttle 162 at the second end 151 of the chamber 150 engaging the second wall 151a, fluid flows from the first system port 142 to the chamber 150 through the first aperture 152 and from the chamber 150 to the outlet port 146 through the third aperture 156. In response to fluid pressure from the chamber 150 through the first port 170, the valve ball 182 of the second check valve 180 is urged away from the valve seat 184 and fluid can flow from the chamber 150 to the bore 166. In response to fluid pressure in the bore 166, the valve ball 176 of the first check valve 174 is urged against the valve seat 178, interrupting fluid flow from the bore 166 to the second port 172.

Fluid pressure in the bore 166 against the valve ball 176 and fluid pressure in the chamber 150 against the shuttle 162 urges the shuttle 162 fully to the second end 151 of the chamber 150 to the right in FIG. 4. As the shuttle 162 approaches the second end 151 of the chamber 150, the aperture 168 in the shuttle body 164 aligns with the fifth aperture 160 in the chamber 150 to allow fluid flow from the bore 166 to the second bypass 192 and to the second system port 144.

FIG. 4b illustrates the configuration of the valve 140 in response to flow of fluid in the second, clockwise, direction in the second supply line 16 (FIG. 1), from right to left in FIG. 4. When flow in the system is reversed from the first flow direction to the second flow direction, the shuttle 162 is urged to the left in FIG. 4 until the shuttle 162 engages the first wall 149a.

In response to fluid pressure from the second system port 144, and with the shuttle 162 at the second end 151 of the chamber 150 (i.e., before the shuttle has begun to move), the valve ball 176 of the first check valve 174 is urged away from the valve seat 178, allowing fluid flow from the first system port 144, to the bore 166 through the second port 172. Fluid pressure in the bore 166 urges the valve ball 182 of the second check valve 180 against the valve seat 184, interrupting fluid flow from the bore 166 to the first port 170. Fluid pressure acting on the second check valve 180 begins to move the shuttle 162 from the second end 151 of the chamber 150 (FIG. 4a) toward the first end 149 of the chamber 150 (FIG. 4b).

As the shuttle 162 moves toward the first end 149 of the chamber 150, the shuttle 162 blocks the third aperture 156, interrupting fluid communication between the chamber 150 and the outlet port 146. When the shuttle 162 approaches the first wall 149a at the first end 149 of the chamber 150, the aperture 168 in the shuttle body 164 aligns with the fourth aperture 158 in the valve body 148, permitting fluid flow from the bore 166 to the first bypass 190. Fluid can thus flow from the second system port 144 to the bore 166, through the first bypass 190 to the first system port 192. No fluid can flow from the second system port 144 to the outlet port 146. The shuttle 162 moves toward the first end 149 of the chamber until the shuttle 162 engages the first wall 149a.

Preferably, the valve ball 182 of the second check valve 180 is urged against the valve seat 184 before the shuttle 162 moves toward the first end 149 of the chamber 150. Thus, full system pressure is acting on the second check valve 180 and the shuttle 160 to move the shuttle 160 positively from the second end 151 toward the first end 149 of the chamber 150.

FIG. 5 is a series of cutaway views illustrating operation of a third embodiment of a flow direction sensing valve 200 for use with the system 10 of FIGS. 1 or 2. The valve 200 includes a first system port 202, a second system port 204 and an outlet port 206. The valve 200 may be used in conjunction with the system 10 of FIGS. 1 and 2 to provide the function of the first control valve 64 in FIGS. 1 and 2, with first system port 202 corresponding to first system port 72, second system port 204 corresponding to second system port 74, and outlet port 206 corresponding to outlet port 76. The valve 200 includes a body 208 defining a chamber 210. The chamber 210 is in fluid communication with the first system port 202, the second system port 204 and the outlet port 206. The body includes a first aperture 201, a second aperture 203 and a third aperture 205. The chamber 210 has a first end 209 terminating in a first wall 209a and a second end 211 terminating in a second wall 211a. A shuttle 212 is located within the chamber 210. The shuttle 212 is movable between a first position at the second end 211 of the chamber 210 adjacent the second wall 211a, illustrated in FIG. 5a, and a second position at the first end 209 of the chamber 210 adjacent the first wall 209a, illustrated in FIG. 5e.

The shuttle 212 includes a shuttle body 214 defining a bore 216. The shuttle body 214 includes a first shuttle port 215 in fluid communication with the bore 216 and a second shuttle port 217 in fluid communication with the bore 216. Within the bore 216 is a valve ball 218 movable on one or more guides 220. A first stop 222 is located at the right end of the body 208 and extends through the third aperture 205 into the chamber 210.

FIG. 5b is an end view of the valve 200 taken along section B–B' in FIG. 5a. As can be seen in FIG. 5b, the first stop 222 includes ribs 230, 232, 234, 236 which extend from the perimeter 238 of the second system port 204 and intersect near an axial centerline 240 of the valve 200. A second stop 224 is located at the left end of the body 208 and extends through the first aperture 201 into the chamber 210. The second stop 224 is preferably substantially identical to the first stop 222 and includes ribs analogous to ribs 230, 232, 234, 236, as illustrated in FIG. 5b. The design of the first stop 222 and the second stop 224 allows fluid to flow through the valve 200 by passing around the ribs 230, 232, 234, 236.

The shuttle 212 further includes a first valve seat 242 and a second valve seat 244. In response to fluid pressure in the bore 216 from the left to the right in FIG. 5, the valve ball 218 is urged along guides 220 and against the first valve seat 242 and away from the second valve seat 244, to interrupt fluid flow from the bore 216 to the second shuttle port 217. In response to fluid pressure in the bore 216 from the right to the left in FIG. 5, the valve ball 218 is urged along guides 220 and against the second valve seat 244 and away from the first valve seat 242 to interrupt fluid flow from the bore 216 to the first shuttle port 215. When the shuttle 212 is at the second end 211 of the chamber 210 (FIG. 5a), the first stop 222 dislodges the valve ball 218 from the first valve seat 242 to permit fluid flow from the bore 216 to the second shuttle port 217 and the second system port 204. When the shuttle 212 is at the first end 209 of the chamber 210 (FIG. 5e), the second stop 224 dislodges the valve ball 218 from the second valve seat 244 to permit fluid flow from the bore 216 to the first system port 202.

FIG. 5a illustrates the configuration of the valve 200 in response to flow of fluid in the first, counterclockwise direction in the second supply line 16 (FIG. 1), from left to right in FIG. 5. Responsive to fluid flow in the first direction, the shuttle 212 is urged toward the second end 211 of the chamber 210, to the right in FIG. 5, engaging the second wall 211a. Similarly, the valve ball 218 is urged to the right. However, with the shuttle 212 at the second end 211 of the chamber 210, the first stop 222 dislodges the valve ball 218 from the first valve seat 242 to allow fluid to flow around the valve ball 218 within the bore 216, from the first system port 202 to the second shuttle port 217 and the second system port 204. In addition, with the shuttle 212 in the first position at the first end 211 of the chamber 210, the second aperture 203 is open and fluid can flow from the first system port 202 through the chamber 210 to second aperture 203 and the outlet port 206.

FIG. 5c illustrates the configuration of the valve 200 immediately after fluid flow has been reversed in the second supply line 16 (FIG. 1) to flow from right to left in FIG. 5. When fluid flow is reversed, the valve ball 218 is urged along the guides 220 to the left end of the bore 216. The valve ball 218 is urged against the second valve seat 244 to prevent flow of fluid from the bore 216 to the outlet port 206. System pressure then acts on the valve ball 218 and the shuttle 212, causing the shuttle 212 to move toward the first end 209 of the chamber 210.

FIG. 5d illustrates the configuration of the valve 200 during a transient condition following reversal of fluid flow in the second supply line 16 (FIG. 1). In FIG. 5d, fluid pressure in the bore 216 urges the valve ball 218 against the second valve seat 244, preventing fluid flow from the bore 216 to the first system port 202 or the outlet port 206. In FIG. 5d, the shuttle 212 blocks the second aperture 203, interrupting fluid flow from the chamber 210 to the outlet port 206. Full system pressure is acting on the shuttle 212, including the valve ball 218, during this transient condition. Thus, the shuttle 212 moves positively and rapidly to the first end 209 of the chamber 210.

In FIG. 5e, in response to fluid pressure, the shuttle 212 has moved to the second position at the first end 209 of the chamber 210, fully to the left in FIG. 5e, engaging the first wall 209a. The valve ball 218 has been dislodged from the second valve seat 244 by the second stop 224 which extends through the first aperture 201 and into the bore 216 when the shuttle 212 engages the first wall 209a. Since the valve ball 218 is dislodged from the second valve seat 244, fluid can flow from the bore 216 around the valve ball 218 and the ribs of the second stop 224 (similar to ribs 230, 232, 234, 236 of the first stop 222 in FIG. 5b) to the first system port 202. The shuttle 212 blocks flow of fluid to the outlet port 206. With the shuttle 212 and the valve ball 218 configured as illustrated in FIG. 5c. Flow is enabled through the bore 216 from the second system port 204 to the first system port 202.

When fluid flow is again established in the first, counterclockwise direction in the second supply line 16 (FIG. 1), from left to right in FIG. 5, the valve ball 218 is again urged to the first end of the shuttle 212, engaging the first valve seat 242 and blocking fluid flow through the bore 216. This permits system pressure to force the shuttle 212 back toward the second end 211 of the chamber 210. The second aperture 203 is uncovered by the shuttle 212 as the shuttle 212 moves toward the second end 211 of the chamber 210, thus allowing flow of fluid from the first system port 202 to the outlet port 206. When the shuttle 212 approaches the second end 211 of the chamber 210, the first stop 222 engages the valve ball 218. The continued movement of the shuttle 212 due to fluid pressure causes the shuttle 212 to continue to move to the second end 211 of the chamber 210 until the shuttle 212 engages the second wall 211a. The first stop 222 dislodges the valve ball 218 from the first valve seat 242 and allows fluid to flow from the first system port 202, through the chamber 210 to the second system port 204. Fluid also flows from the first system port 202 to the outlet port 206.

As can be seen from the foregoing, the present invention provides a system for supplying a fluid such as liquid diet to a plurality of delivery stations. In a first operating mode, the system supplies the liquid diet. In a second operating mode, the system reverses flow of fluid in the system to allow a second fluid, such as cleaning fluid, to be circulated in the system. The system automatically prevents the cleaning fluid from being supplied to the delivery stations, thereby preventing injury to animals or death of animals. The system is fully automatic and does not require human intervention for closing or opening supply valves. The invention further provides a flow direction sensing control valve for use in the system.

It is to be understood that, while the detailed drawings and specific examples given describe preferred embodiments of the invention, they are for the purpose of illustration only, that the apparatus of the invention is not limited to the precise details and conditions disclosed, and that various changes may be made therein without departing from the spirit of the invention which is defined by the following claims.

We claim:

1. A system for dispensing a fluid from a source of said fluid to at least one delivery station, said system selectively establishing a fluid flow in a first flow direction or a second flow direction, the system comprising:

a first supply line having a first first end and a first second end, said first first end being coupled with said source of said fluid;

a second supply line having a second first end and a second second end, said at least one delivery station being coupled to said second supply line intermediate said second first end and said second second end;

a return line having a third first end and a third second end, said third first end being coupled to said source of said fluid;

reversing valve means for selectively establishing said fluid flow in one of said first flow direction and said second flow direction, said reversing valve means coupling one of said first second end and said third second end to said second first end and the other of said first second end and said third second end to said second second end; and control valve means responsive to said fluid flow for selectively establishing fluid communication between said second supply line and one delivery station of said at least one delivery station.

2. A system for dispensing a fluid from a source of said fluid to at least one delivery station as recited in claim 1 wherein the system further comprises circulation means for establishing said fluid flow in said system.

3. A system for dispensing a fluid from a source of said fluid to at least one delivery station as recited in claim 2 wherein said circulation means comprises a pump.

4. A system for dispensing a fluid from a source of said fluid to at least one delivery station as recited in claim 1 wherein said reversing valve means comprises a four way directional control valve.

5. A system for dispensing a fluid from a source of said fluid to at least one delivery station as recited in claim 4 wherein said four way directional control valve includes a first port coupled with said first second end, a second port coupled with said third second end, a third port coupled with said second second end and a fourth port coupled with said second first end.

6. A system for dispensing a fluid from a source of said fluid to at least one delivery station as recited in claim 5 wherein said four way directional control valve has a first configuration for establishing said fluid communication from said first port to said third port and from said fourth port to said second port, and a second configuration for establishing fluid communication from said first port to said fourth port and from third port to said second port.

7. A system for dispensing a fluid from a source of said fluid to at least one delivery station as recited in claim 1 wherein said control valve means comprises a body defining a chamber, said body having a first system port in fluid communication with said second supply line, a second system port in fluid communication with said second supply line, and an outlet port in fluid communication with said one delivery station, each of said first system port, said second system port and said outlet port being in fluid communication with said chamber, and control means for controlling said fluid communication among said first system port, said second system port and said outlet port, said control means being moveable between a first position and a second position, said control means establishing said fluid communication among said first system port, said second system port and said outlet port when said control means is in said first position, said control means interrupting said fluid communication between said second system port and said outlet port when said control means is in said second position, said control means moving to said first position responsive to said fluid flow being in said first flow direction, said control means moving to said second position responsive to said fluid flow being in said second flow direction, said control means moving from said first position to said second position at a first time after said reversing valve means reverses said fluid flow from said first flow direction to said second flow direction, said control means further including check valve means for interrupting said fluid communication between said second system port and said outlet port at a second time after said reversing valve means reverses said fluid flow from said first flow direction to said second flow direction, said second time occurring before said first time.

8. A system for dispensing a fluid from a source of said fluid to at least one delivery station, the system comprising:

fluid conductor means for communicating said fluid, said fluid conductor means having a first end and a second end, at least one end of said first end and said second end being in fluid communication with said source;

reversing valve means for selectively establishing a fluid flow in said fluid conductor means in one direction of a first flow direction and a second flow direction; and control valve means responsive to said fluid flow for selectively establishing fluid communication between one delivery station of said at least one delivery station and said second end of said fluid conductor means.

9. A system for dispensing a fluid from a source of said fluid to at least one delivery station as recited in claim 8 wherein said control valve means comprises a body defining a chamber, said body having a first system port in fluid communication with said fluid conductor means, a second system port in fluid communication with said fluid conductor means, and an outlet port in fluid communication with said at least one delivery station, each of said first system port, said second system port and said outlet port being in fluid communication with said chamber, and control means for controlling said fluid communication among said first system port, said second system port and said outlet port, said control means being moveable between a first position and a second position, said control means establishing said fluid communication among said first system port, said second system port and said outlet port when said control means is in said first position, said control means interrupting said fluid communication between said second system port and said outlet port when said control means is in said second position, said control means moving to said first position responsive to said fluid flow being in said first flow direction, said control means moving to said second position responsive to said fluid flow being in said second flow direction, said control means moving from said first position to said second position at a first time after said reversing valve means reverses said fluid flow from said first flow direction to said second flow direction, said control means further including check valve means for interrupting said fluid communication between said second system port and said outlet port at a second time after said reversing valve means reverses said fluid flow from said first flow direction to said second flow direction, said second time occurring before said first time.

10. A system for dispensing a fluid from a source of said fluid to at least one delivery station as recited in claim 8 wherein said fluid conductor means comprises a first supply line intermediate said source and said reversing valve means and a second supply line intermediate said reversing valve means and said control valve means.

11. A system for dispensing a fluid from a source of said fluid to at least one delivery station as recited in claim 10 wherein said fluid conductor means further comprises a return line intermediate said reversing valve means and said source.

12. A system for dispensing a fluid from a source of said fluid to at least one delivery station as recited in claim 11 wherein said reversing valve means comprises a four way directional control valve.

13. A system for dispensing a fluid from a source of said fluid to at least one delivery station as recited in claim 12 wherein said four way directional control valve has a first port, a second port, a third port and a fourth port, and wherein said first port is coupled with a first end of said first supply line, said first supply line having a second end coupled with said source, and wherein said second port is coupled with a first end of said return line, said return line having a second end coupled with said source, and wherein said third port is coupled with a first end of said second supply line and said fourth port is coupled with a second end of said supply line.

14. A system for dispensing a fluid from a source of said fluid to at least one delivery station as recited in claim 13 wherein said four way directional control valve has a first configuration for establishing said fluid communication from said first port to said third port and from said fourth port to said second port, and a second configuration for establishing fluid communication from said first port to said fourth port and from said third port to said second port.

15. A system for dispensing a fluid from a source of said fluid to at least one delivery station as recited in claim 8 wherein said reversing valve means comprises a plurality of two way valves.

16. A system for dispensing a fluid from a source of said fluid to at least one delivery station as recited in claim 8 wherein the system further comprises circulation means coupled with said fluid conductor means for establishing said fluid flow in said fluid conductor means.

17. A system for dispensing a fluid from a source of said fluid to at least one delivery station as recited in claim 16 wherein said circulation means comprises a pump.

* * * * *